United States Patent [19]

Johnson

[11] 3,956,047
[45] May 11, 1976

[54] METHOD AND APPARATUS FOR BUTT WELDING THERMOPLASTICS SHEETS AND FILMS

[75] Inventor: David Emil Johnson, Macedon, N.Y.

[73] Assignee: Mobil Oil Corporation, New York, N.Y.

[22] Filed: Feb. 1, 1974

[21] Appl. No.: 438,925

[52] U.S. Cl. .............................. 156/159; 156/263; 156/304; 156/504; 156/507; 156/518; 156/539
[51] Int. Cl.² ........................................ B65H 69/06
[58] Field of Search ........... 156/157, 159, 304, 306, 156/502, 504, 507, 322, 258, 263, 518, 535, 539; 242/76, 58.1, 58.4, 58.5

[56] References Cited
UNITED STATES PATENTS

| | | | |
|---|---|---|---|
| 2,379,500 | 7/1945 | Steffens | 156/304 |
| 2,516,602 | 7/1950 | Snyder | 156/507 |
| 2,613,042 | 10/1952 | Dice, Jr. | 242/58.4 |
| 2,988,134 | 6/1961 | Nissel | 156/304 |
| 2,998,204 | 8/1961 | Walsh | 242/58.1 |
| 3,384,527 | 5/1968 | Fener | 156/515 |

Primary Examiner—William A. Powell
Assistant Examiner—Brian J. Leitten
Attorney, Agent, or Firm—Charles A. Huggett; Michael G. Gilman; James D. Tierney

[57] ABSTRACT

Improvement in the process and apparatus of Application Ser. No. 236,766 filed Mar. 21 1971, now U.S. Pat. No. 3,769,124. There is described a technique for butt welding a trailing end of one roll of thermoplastic film or sheet material to the leading edge of another roll of such material by vertically superimposing the trailing and leading portions of the two rolls, aligning the lateral edges of such portions over a significant distance sufficient to insure angular alignment of the two rolls at the butt weld. Severing the two portions along a coincident transverse line, heating the severed portions to an extent sufficient to weld such together, and bringing the heated transverse edges of the two portions together while maintaining lateral edge alignment of said portions, whereby butt welding such into a continuous sheet.

2 Claims, 4 Drawing Figures

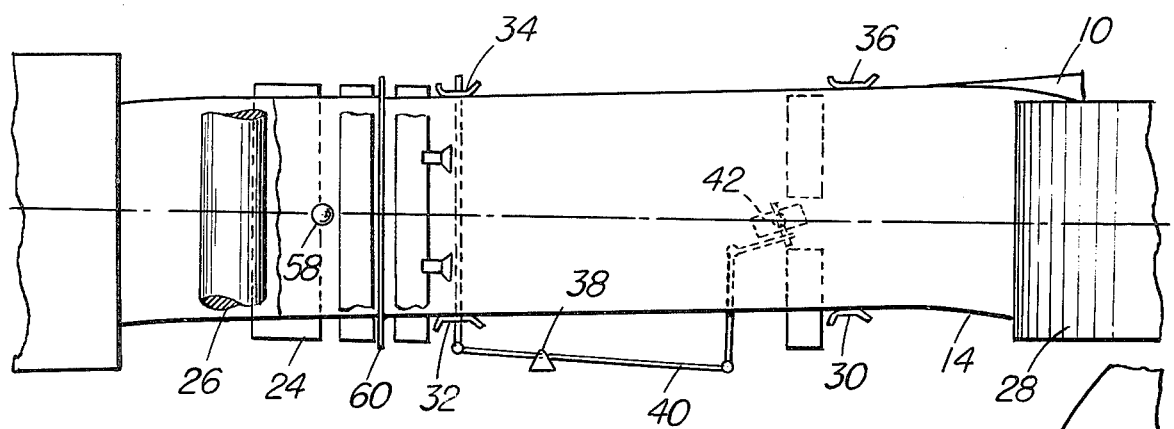
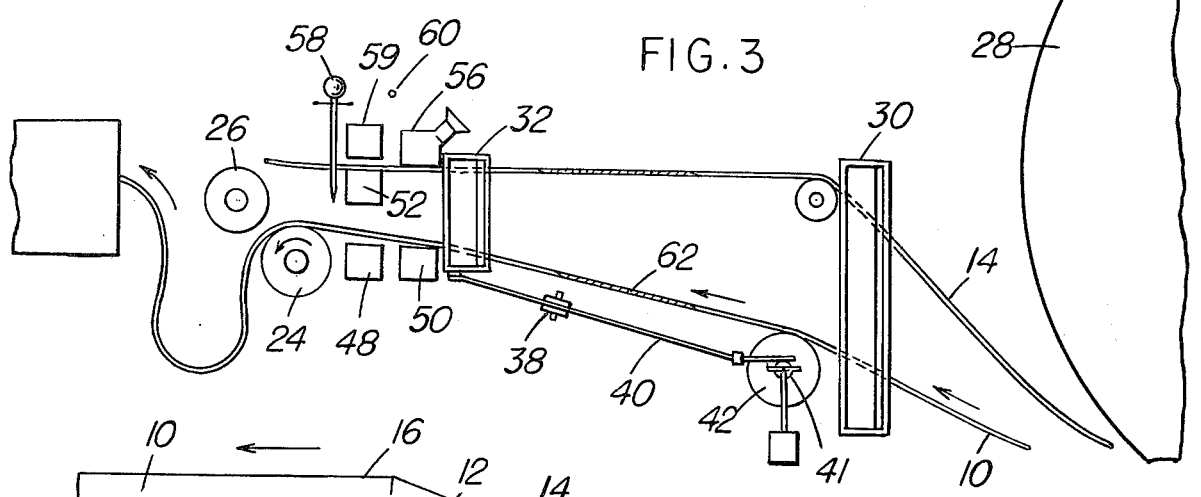
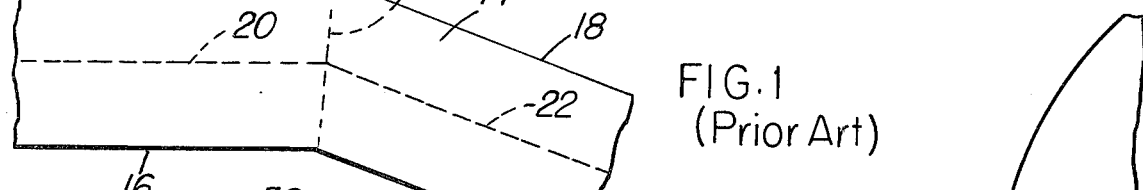
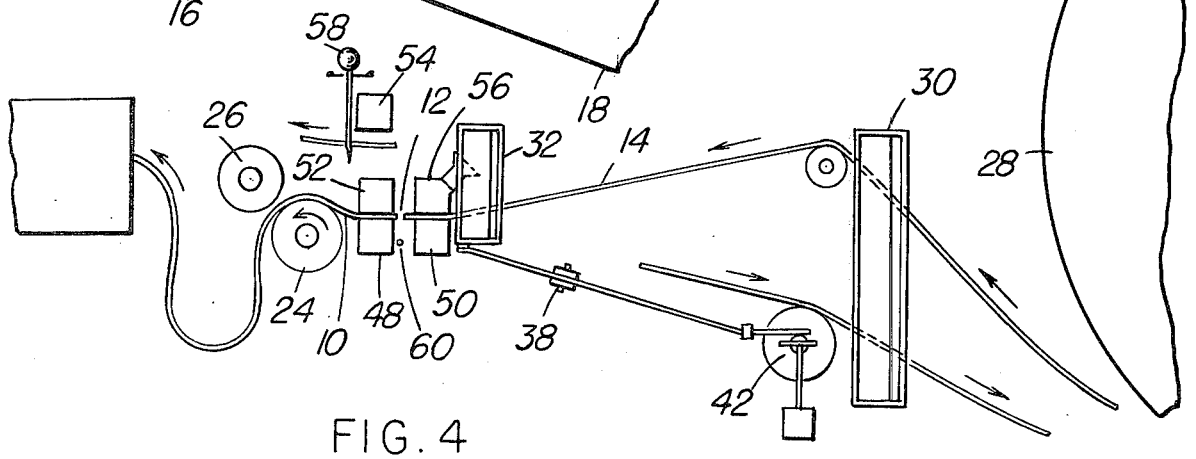

METHOD AND APPARATUS FOR BUTT WELDING THERMOPLASTICS SHEETS AND FILMS

This invention relates to butt welding films or sheets of thermoplastic material. It more particularly refers to a process and apparatus for carrying this out in an improved manner.

Application Ser. No. 236,766 filed Mar. 21, 1972, now U.S. Pat. No. 3,769,124 described a technique for butt welding a leading edge of one roll of foam polystyrene sheet material to a trailing edge of another roll of similar foam polystyrene sheet material. According to this prior application, the contents of which are incorporated by reference; a portion of the leading edge of a first foam sheet is transversely severed by contacting such with a moving hot element; a portion of the trailing edge of a second foam sheet is transversely severed by contacting such with further movement of the same hot element; the two transverse heated severed edges are then butted and welded together.

While this process, and the apparatus which is used to carry it out, performs its intended function very well, it has been found in practice that there sometimes occurs a canting of one sheet with respect to the other. Since the thermoplastic sheet material in question here is usually wound on rolls in a less than absolutely laterally aligned fashion, the end of one roll may be laterally displaced with respect to the beginning of the next roll. In the process and apparatus of the above referred to prior application, the two sheets to be butt welded are aligned along the line where the transverse severing will be accomplished and are vertically spaced apart, the hot wire severing means passes vertically through both sheets sequentially and the sheets are brought together while the severed transverse edges are hot enough to weld on contact. Where there is lateral displacement of the rolls, the welded edges are canted, or angularly displaced, with respect to each other. FIG. 1 of the accompanying drawing shows this condition in a much exaggerated form.

It is therefore an important object of this invention to provide a novel process of butt welding two sheets of thermoplastic material.

It is another object of this invention to provide a novel apparatus for carrying out this novel process.

It is a further object of this invention to provide a novel technique for angularly aligning two sheets of thermoplastic material.

Other and additional objects of this invention will become apparent from a consideration of this entire specification including the claims and the drawing hereof.

Understanding of this invention will be facilitated by reference to the accompanying drawing in which:

FIG. 1 is a perspective diagramatic representation of the problem encountered by the prior art;

FIG. 2 is a vertical schematic view of the process and apparatus of this invention;

FIG. 3 is a plan schematic view, with appropriate parts broken away, of the process and apparatus of this invention; and FIG. 4 is similar to FIG. 2 showing the process at the point of butt welding.

In accord with and fulfilling these objects, one aspect of this invention resides in a process comprising: providing a trailing portion of a first length of thermoplastic film or sheet, of substantially the same width as said first sheet, vertically displaced from said first sheet; overlapping a significant length of said two sheets; vertically aligning the respective lateral edges of said two sheets over said significant length; sequentially severing said two sheets along substantially identical transverse lines within said significant length; discarding the forward severed portion of one of said sheets and the rearward severed portion of the other of said sheets; heating the remaining severed transverse edges; and bringing such heated transverse edges into abutting relationship, whereby butt welding said sheets together in substantial lateral axial and vertical alignment.

As noted in the prior referred to patent application, the preferred form of film or sheet for use in this invention is foam form and the perfered thermoplastic material is polystyrene. The preferred severing technique is by means of a hot wire which passes downwardly through the two sheets sequentially to sever the forward and rearward portions referred to above. After discarding these severed portions, the hot wire passes upwardly again heating the transverse severed ends sufficient to permit them to butt weld together.

In order to laterally align the superimposed portions of the two sheets, upstream and downstream vertical guides are provided extending more than the vertical distance between the two sheets. The guides are on at least one lateral side of both sheets and means are provided to bear both sheets against the guides. The guides are streamwise spaced apart a significant distance as afore said. In a preferred embodiment of this invention two pairs of vertical guides are provided. One pair is upstream, disposed on each lateral side of both sheets, while the other pair is downstream, disposed on each lateral side of both sheets.

In a preferred embodiment of this invention, the downstream vertical guide means is pivotally joined to a wheel means operatively associated with one of the sheets, preferably the trailing portion of the first length of sheet. As the sheet Moves laterally, it tends to force the downstream vertical guide to move in the same lateral direction. This motion is translated through a series of lever means to the wheel means. Where there is no lateral displacement of the downstream vertical guide means, the wheel means axis is substantially transverse to the sheet axis. As the downstream vertical guide means is moved laterally, the axis of the wheel means is proportionally canted in the opposite direction whereby tending to drive the sheet back toward a more centrally disposed lateral alignment. This guide and compensating means eases the burden of laterally aligning the two sheets being butt welded by minimizing the lateral off-set of one with respect to the other. It is preferred that the upstream vertical guide means is disposed upstream of the wheel means referred to above and there be no control linkages between this upstream vertical guide means and either the downstream vertical guide means or wheel means. If desired, however, control linkages can be provided between these various means.

It is considered to be the principal purpose of this process and apparatus to butt splice two sheets of thermoplastic material without interrupting the flow of the process in which the sheets are being used. For example, the first sheet referred to above is preferably the end of a roll of such sheet material which is being fed into further processing, e.g. thermoforming. The second sheet referred to above is preferably the start of a second roll of such sheet material which will be fed into the same further processing. The butt welding of these two sheets together is for the purpose of carrying out the referred to further processing without roll change interuption. In order to accomplish this, the feeding of the sheet off the roll into the further processing must be in such manner as to provide sufficient time to make the butt splice referred to herein. This can be accomplished through the use of intermittent feed, with sufficient time lapse between feeds to make the splice. Intermittent feed can be accomplished in a conventional manner via engaging/disengaging roll pair means with either the driven or the idler roller moving into and out of contact with the sheet being fed. Alternatively, intermittent feed can be conventional means of the pull type, where a length of sheet is pulled from the roll, the pulling is stopped until the pulled length is used up in further processing and then additional length of sheet is pulled from the roll. Other conventional intermittent feed means are available and will suggest themselves to those skilled in the art.

In any case, and regardless of what intermittent feed means is used, the drive for this feed means is preferably between the butt welding means of this invention and the further processing means being fed. The butt weld referred to herein must be made during the short time interval when no sheet is being fed to the further processing.

The splicing, or butt welding referred to herein can be initiated and controlled manually or automatically depending upon the particular preference of the user. Sensing means can be provided associated with the first sheet to sense that the end of the sheet is approaching and to activate the splicing technique referred to herein. This sensing can be mechanical, as by means of a mechanical feeler on the roll of first sheet set to judge the ending of the roll, or an electric eye set to accomplish the same purpose, or a length counter to determine how much of a standard length roll has been used up.

The second sheet roll is suitably positioned so that the starting edge of this sheet is above the trailing end of the first sheet, but this need not be so. If for some reason it is desired, the vertical positions of the two sheets can be reversed.

It is within the scope of this invention to provide means for removing the severed front and rear ends of the two sheets. This can be accomplished by tension activated reverse spinning rolls operatively connected to the scrap front and/or rear pieces of sheet respectively. Alternatively scrap can be pulled out of the apparatus by hand.

Referring now to the drawing, and particularly to FIG. 1 thereof, the prior art problem is shown exaggerated in which a first sheet 10 is butt welded 12 to a second sheet 14. It should be noted that while the lateral edges 16 and 18 repectively, of the two sheets align at the point of the butt weld 12, the axes 20 and 22 respectively of the two sheets are not coincident whereby causing the sheets to be canted with respect to each other.

FIGS. 2, 3 and 4 show the butt splicing process and apparatus of this invention. A first sheet 10 passes through the nip of a pair of rollers 24 and 26 which form an intermittent drive means. A second sheet 14 is fed into the butt splicing means from a new roll 28 thereof. Two pairs of vertical edge guides 30, 32, 34 and 36 are provided with a pair of each, 30 and 34, and 32 and 36 respectively, spaced upstream and downstream a finite, reasonable distance apart and defining the lateral extent of the sheets 10 and 14 between guide pairs 30 and 36 and 32 and 34 respectively. It should be noted that the downstream pair of vertical guides 32 and 34 are laterally floating. This pair of guides is pivotally 38 connected through a linkage 40 to a guide wheel 42 which is itself pivotally mounted 44 so as to point its direction of rotation proportionally opposite to the lateral float direction of the downstream vertical guide pair.

The first sheet 10 passes over a lower clamp means 48 and 50, and below a frame 52. The second sheet 14 passes over the frame 52 and below a clamp 54 and a vacuum means 56. For temporarily holding the second sheet 14 in streamwise position without preventing its lateral alignment motion consistant with the position of the vertical guides, a spike 58 is provided to penetrate the second sheet 14. Other temporary holding means can be used to replace this spike.

A resistance wire 60 is provided initially disposed above the second sheet 14 but adapted to pass downwardly through both the second and the first sheets respectively to sever each in substantially identical transverse alignment, and then to pass upwardly past the severed ends. The wire 60 is heated by resistance heating via current input (not shown) sufficient to melt cut the sheets and heat the cut edges enough to permit butt welding thereof.

In the operation of the depicted device, the vertical guides 30, 32, 34 and 36 laterally align the first and second sheet. The hot wire passes down through the two sheets transversely cutting them while the lower or first sheet is held between the frame 52 and the downstream lower clamp 48 and the upper or second sheet is held by the vacuum means 56. The trailing, severed end 62 of the lower or first sheet is ejected while the severed transverse edge of the second sheet is brought down into proximity to the severed end of the first sheet. The hot wire passes upwardly past the two severed ends, heating such to thermoforming temperatures and the two heated ends are butted by the vacuum means bringing the second sheet against the upstream most lower clamp 50 as shown in FIG. 4.

What is claimed is:

1. A method of thermally splicing together the edges of a first and second thermoplastic foam sheet, comprising sequentially (a) providing a first and second thermoplastic foam sheet to be spliced, (b) providing at least two spaced-apart pair of edge guide means abutting said sheets at their respective lateral edges to laterally and axially align said first and second sheets to be spliced prior to splicing, (c) completely transversely severing the leading section of said first thermoplastic foam sheet with a heated element to expose a transverse edge of said first sheet to be spliced, (d) completely transversely severing, by continued movement of said heated element, the trailing section of said second thermoplastic foam sheet to expose a transverse edge of said second sheet to be spliced, (e) moving said heated element in the reciprocal direction adjacent the exposed transverse edges to heat said edges to a temperature sufficient for the edges to be thermally welded, and (f) bringing the heated transverse edges into abutting relationship to thermally weld said edges together, while maintaining the sheets aligned with said edge guide means.

2. A method in accordance with claim 1 wherein the step of providing said guide means to laterally align said first and second sheets to be spliced includes moving one of said sheets laterally through a distance substantially equal to the distance it is out of lateral alignment with said second sheet to align said sheets.

* * * * *